Patented Dec. 16, 1930

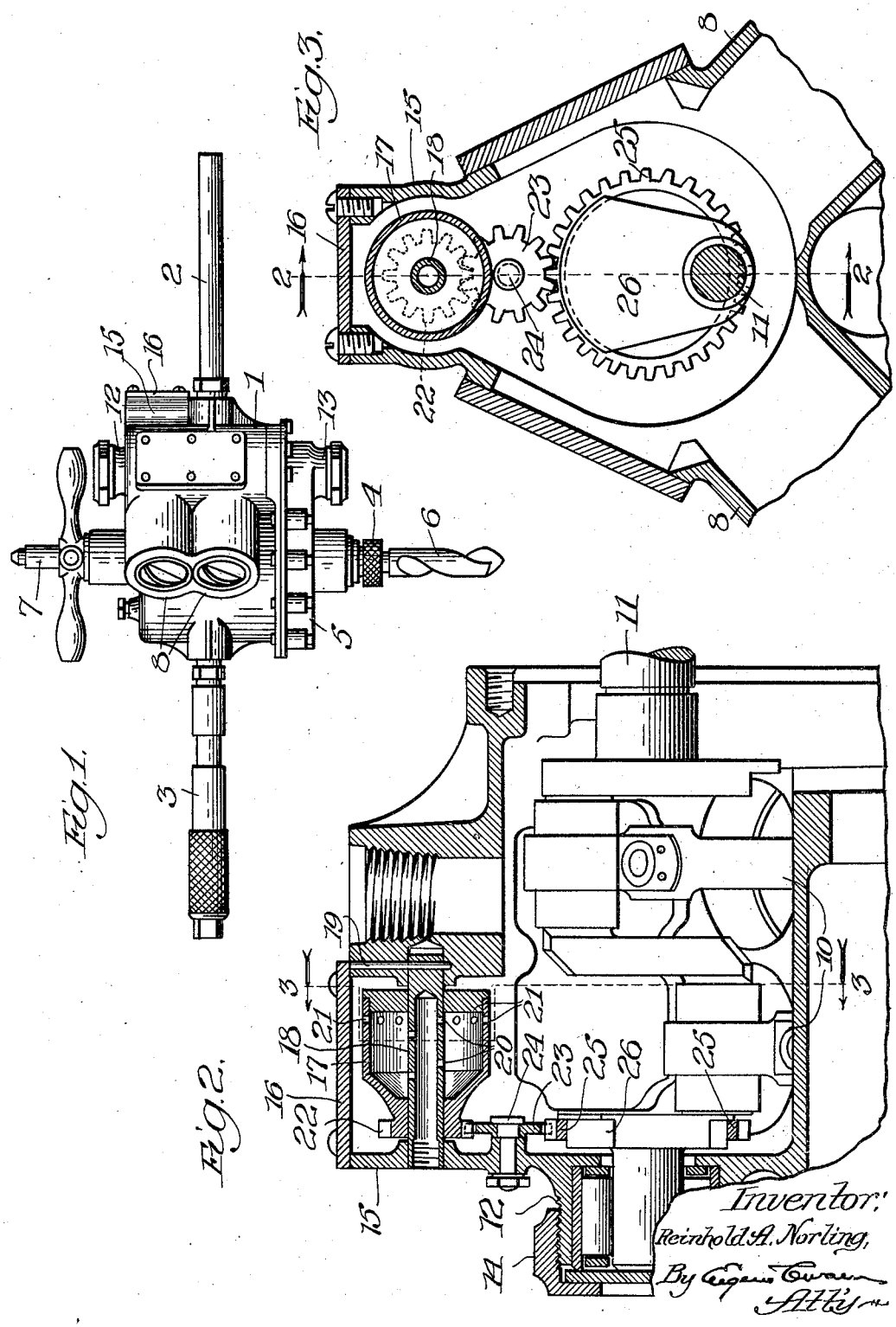

1,785,527

UNITED STATES PATENT OFFICE

REINHOLD A. NORLING, OF AURORA, ILLINOIS, ASSIGNOR TO INDEPENDENT PNEUMATIC TOOL COMPANY, OF CHICAGO, ILLINOIS, A CORPORATION OF DELAWARE

VENTING MEANS FOR PNEUMATIC DRILLS

Application filed April 25, 1927. Serial No. 186,269.

This invention relates to crank case venting for rotary pneumatic tools, such as drills.

In tools of this type, the crank and gear cases are united, and the moving parts of the motor, such as the crank shaft and connecting rod bearings, and also the gears, are lubricated by the splash system, a slow flowing oil or grease being employed as the lubricant. These tools in operation are placed and held in various positions, up, down, horizontal, and at angles, depending on the lay of the work. It therefore follows that the lubricant from gravity accumulates in various places in the drill case according to the positions of the tools. The cylinder and valve bores of the motor open into the crank and gear cases, respectively, and the compressed air used in operating the tools leaks into both cases. Unless prevented, there would be an undesirable accumulation of air pressure in the crank case. Should a plain hole be made in the crank case for venting purposes, there would always be some position of the tool where the lubricant would cover the hole and be forced out of the case as the pressure therein increased. Even in other positions, the lubricant would be forced out of the case with the escaping air, as the lubricant is churned and becomes aerated in the operation of the tool and thus is readily carried out with the escaping air.

Prior Patent No. 1,591,539, granted July 6, 1926, to myself and Axel Levedahl, discloses a venting in which the air vent passage is formed in the crank shaft and communicates with the atmosphere through one end of the shaft, preferably the upper end, that is, the end which is uppermost when the tool is held in a position with the drill bit extending downward. With the passage so provided, it must open through the thrust plate in the bearing extension on the case for the shaft and, as the shaft in its end play moves away from this plate, the lubricant which follows the air is allowed to leak out of the case about the end of the shaft.

In my copending applications Serial Nos. 184,564 and 186,268, filed April 18th and 25th, 1927, the vent is through the crank case and not through the crank shaft so that the ends of the latter may be tightly closed to prevent leakage about the same. Both applications disclose rotary means associated with the vents for separating the lubricant from the escaping air by centrifugal action, said means having valves which open and close the vent passages through the increase and decrease of this action. While these valves have their advantages, there may be times when the vents are closed, as when the drill stops or the air pressure in the case is not sufficient to unseat the relief valve as in the application Serial No. 186,268, aforesaid.

The main object of the present invention is to provide a vent means having all of the advantages of the structures of said applications, but which is so made and mounted that no valve means are required for the vent passage either in connection with the centrifugal action or without it. Thus with the structure of this present application, the crank case is open at all times to the atmosphere, yet lubricant is separated from the escaping air and retained in the case by centrifugal action, as before.

The invention consists further in the matters hereinafter described and claimed.

In the accompanying drawings—

Fig. 1 shows a portable pneumatic drill equipped with a venting means of my present invention;

Fig. 2 is an enlarged vertical sectional view taken on line 2—2 of Fig. 3, to show the venting structure; and Fig. 3 is a similar sectional view taken on line 3—3 of Fig. 2.

The tool shown in Fig. 1 has a motor case 1 with a handle 2 on one side and a combined handle and throttle valve 3 on the opposite side, and through the latter of which compressed air is supplied to the tool for operating it. The spindle 4 of the tool extends outward through the gear case 5 which is bolted to the motor case 1 at one end thereof. The spindle 5 is made to carry a drill bit 6, as in tools of this general design. At the opposite end of the tool is a screw feed 7, as customary.

The case 1 is provided on each side with a pair of parallel cylinders 8, 8, only one pair being shown in the drawings. These cylinders are arranged V type and in them work single acting pistons 9 (only one being shown). The pistons are connected by connecting rods 10, 10 to a crank shaft 11. The shaft 11 is offset to one side of the spindle 4 and is geared thereto, the gears being in the gear case 5. The ends of the shaft 11 are journaled in roller bearings in tubular extensions 12, 13 on the cases 1 and 5, respectively. These extensions are tightly closed over the ends of the shaft 11 by screw cap assemblies 14, 14, and lubricant is prevented from leaking out of the cases about the ends of the crank shaft.

The case 1 is provided with a side extension 15 over which is secured a plate 16, which closes the opening into the case 1 through said extension. The handle 2 is screwed into this extension at one end of the case, as shown. Located in this extension beneath the cover is a rotary member 17 in the form of a hollow drum and mounted on a shaft 18 which has its ends supported in the walls of the extension. The shaft 18 is held stationary by a pin 19 inserted in the extension and through one end of the shaft, said pin being held in place by having its outer end beneath the cover plate 16. The rest of the shaft 18 is made hollow to provide a vent passage therethrough, said passage opening to the atmosphere through the end of the shaft opposite the pin 19. Apertures 20, 20 in the hollow portion of the shaft 18 communicate it with the interior of the drum 17, and the latter has a row of apertures 21, 21 extending about the same near the end of the drum nearest the pin 19.

The opposite end of the drum 17 has gear teeth 22, which mesh with a pinion 23 mounted on a stud 24 supported by the case below the extension 15. The pinion 23 meshes with a ring gear 25 having a pressed fit on one of the arms 26 of the crank shaft 11.

Air leaking into the cases 1 and 5 from the pistons and valves of the motor, must pass through the drum 17 to escape to the atmosphere through the hollow portion of the shaft 18. As the air must first pass through the apertures 21 to reach the interior of the drum, any lubricant carried by the air will be brought into direct contact with the outside of the drum and be retained in the case 1 by being thrown off the drum by centrifugal forces set up as the drum is rotated by the shaft 11. Thus the lubricant is separated from the escaping air and is prevented from being carried thereby out of the case 1. As the drum 17 is located outside of the diameter of the crank shaft 11, as defined by its arms 26, the drum 17 by the gearing described may be rotated faster than said shaft and thus make the centrifugal action more effective.

The drum 17 is preferably disposed with its axis substantially parallel to the crank shaft 11 and adjacent the upper end of the latter, that is, the end which is uppermost when the tool is held in position with the drill bit 6 extending down, as shown in Fig. 1. Thus the air to escape from the case 1 must rise to the upper end of the case and supply lubricant for the upper end of the shaft and its upper connecting rod bearing to prevent such parts running dry. When drilling upward, the tool is held in an inverted position. At this time the drum 17 is at the lower end of the tool and its ports 21 are high enough above the lubricant level in the case when the drill is idle to prevent the lubricant draining out of the case.

With the structure shown and described, no valves are required to open and close the vents, and thus the latter are open to the atmosphere at all times whether the tool is running fast or slow either purposely or when under a heavy load.

The details of structure may be variously changed and modified without departing from the spirit and scope of my invention.

I claim as my invention:

1. In a fluid actuated rotary tool, the combination with a casing, of a crank shaft journalled therein and having crank arms, a hollow drum rotatably mounted within the casing at one side of the crank shaft, said drum having vent apertures and being open to the atmosphere through the casing for venting the same, said drum having gear teeth about the same, a ring gear on one of the arms of the crank shaft, and a pinion within the casing and meshing with said ring gear and teeth on the drum, respectively, whereby the drum will be rotated by the crank shaft.

2. In a fluid actuated rotary tool, the combination with a casing, of a crank shaft journalled therein and having crank arms, a second shaft fitted within the casing at one side of the crank shaft and having an apertured hollow portion open to the atmosphere through the casing for venting the same, a hollow drum mounted on said second shaft and having vent openings therein, said drum having gear teeth about the same, a ring gear on one of the arms of the crank shaft, and a pinion within the casing and meshing with the ring gear and the teeth of the drum, respectively, whereby the drum will be rotated by the crank shaft.

3. In a fluid actuated rotary tool, the combination with a casing, of a crank shaft journalled therein and having crank arms, a second shaft fixed within the casing against rotation at one side of the crank shaft in substantially parallel relation thereto, said second shaft having an apertured hollow portion open to the atmosphere at one end through the casing for venting the same, a hollow drum rotatably mounted on said second shaft and having gear teeth about the same adjacent one end and vent apertures therein adjacent the other end, a ring gear fitted to one of the crank arms of the crank shaft, and a pinion carried by the casing and meshing with the ring gear and the teeth on the drum, respectively, whereby the drum will be rotated by the crank shaft.

In testimony whereof I affix my signature this 19th day of April, 1927.

REINHOLD A. NORLING.